Sept. 11, 1956 L. K. WHEELER ET AL 2,762,863
ELECTRONIC REGENERATIVE REPEATER
Filed July 8, 1949
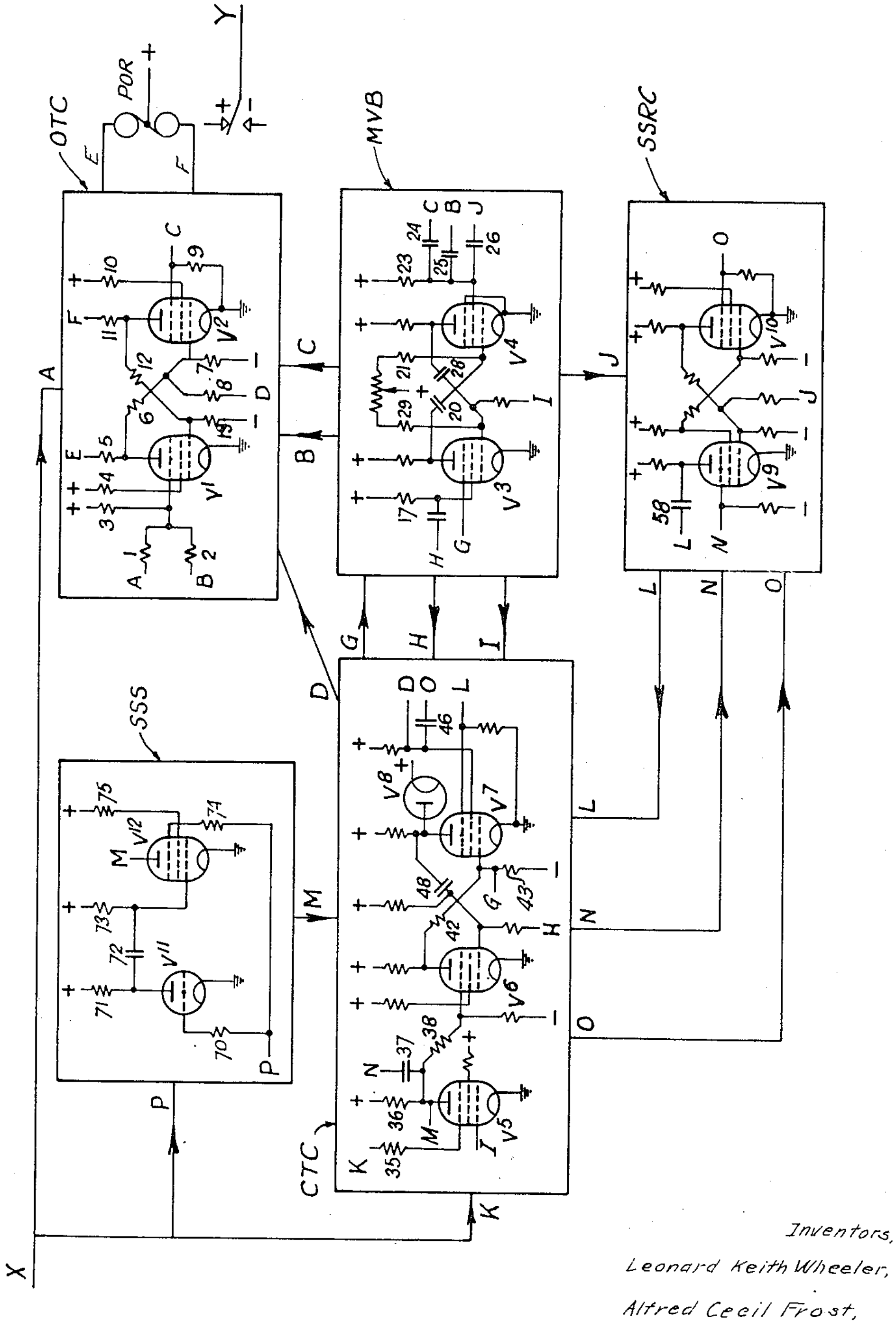
Inventors,
Leonard Keith Wheeler,
Alfred Cecil Frost,
by Hall + Houghton
Attorneys.

United States Patent Office 2,762,863

Patented Sept. 11, 1956

2,762,863

ELECTRONIC REGENERATIVE REPEATER

Leonard Keith Wheeler and Alfred Cecil Frost, London, England

Application July 8, 1949, Serial No. 103,727

Claims priority, application Great Britain July 23, 1948

12 Claims. (Cl. 178—70)

This invention relates to electronic regenerative repeaters for start-stop telegraph systems.

An object of the invention is to provide an improved electronic regenerative repeater which, while employing a comparatively small number of valves, is capable of being arranged to satisfy a number of operational requirements.

When characters of a code are transmitted by start-stop telegraphy the timing of each train of signals associated with a character is independent of the timing of any other character and a fresh character may be transmitted at any arbitrarily determined time after a preceding character has been transmitted. In order to enable this to be done the code signals representing each character are preceded by a start signal which is of the same polarity (known as "space") for all characters and are followed by a stop signal which also is of the same polarity (known as "mark") for all characters. Commonly used codes have five or six equal length elements which may be of mark or space polarity in various permutations to represent various characters. The length of the start signal is usually equal to that of a code element and in various systems the stop signal is from 1 to 1½ times the length of a code element.

Due to various well-known causes signals are liable to distortion when transmitted and this results in an alteration in the time interval between the instant when the start signal of a character is commenced and the instant at which an element of the code is commenced and/or completed. In order to overcome the well-known effects of such variations of the timing of the instants of modulation regenerative repeaters are employed which "sample" incoming signals at the nominal mid-points of the time lengths of each element. According to whether the signal at such mid-instants is space or mark the repeater transmits an element equal in time duration to that of the original transmitted element, the transmitted signals being faithful copies of the original signals. In signalling codes when the stop signal differs in length from the code elements it is usual to sample the stop signal 0.5 of an element time length after its nominal instant of commencement.

Mechanical repeaters, owing to the inertia of the moving parts, do not function with sufficient speed to enable "sampling" to be effected substantially instantaneously and the time taken may be an appreciable fraction of a signal element time length. This limits the maximum distortion which can be tolerated whilst still permitting correct regeneration of signals.

Electronic repeaters have therefore been proposed and such repeaters enable the "sampling" of an incoming element to be carried out more nearly instantaneously.

The improved electronic regenerative repeater according to the invention comprises an electrical circuit adapted to receive signals from an incoming line and to control the operation of means for applying signals of polarity corresponding to the polarity of the received signals to an outgoing line and an oscillator which is arranged to apply impulses to the said circuit and thereby place said circuit into condition to effect operation of the said means to apply a signal of a desired polarity to the outgoing line.

In a further aspect thereof the invention consists in a repeater which comprises an electronic valve circuit adapted to receive signals from an incoming line and to control the operation of means for applying signals of polarity corresponding to the polarity of the received signals to an outgoing line and a relaxation oscillator which is arranged to oscillate at a predetermined frequency in fixed relation to the desired speed of signal transmission and to apply to the said circuit impulses for the purpose of placing said circuit into condition to effect operation of the said means.

The invention further consists in a repeater which comprises an electronic valve circuit adapted to receive signals from an incoming line and to control the operation of means for applying signals of polarity corresponding to the polarity of the received signals to an outgoing line, an oscillator which comprises an electronic trigger circuit having a pair of valves each arranged to control and vary the condition of electron flow through the other valve and thereby to produce impulses at a predetermined frequency and means for applying impulses produced by said trigger circuit to the first mentioned circuit whereby said circuit is placed into condition to effect operation of the said means.

According to a further feature of the invention the oscillator is set in motion at a desired time and stopped after producing a predetermined number of impulses.

Should the faulty or distorted incoming signal be the stop signal, the receiver or repeater as the case may be may not be restored to the rest condition at the conclusion of the transmission of a character with the result that the receiver or repeater may immediately commence a further cycle of operations and record or transmit in succession a number of false characters. The reception of real characters interspersed with such false characters would obviously result in confusion. The repeater, according to a further feature of the invention provides means for the automatic application of a stop signal to the outgoing line so that an idle period is ensured between succeeding characters.

Difficulties may also arise, on both radio and line links, due to the appearance of short spurious periods of "spacing" or "start signal" polarity, which periods may last only a few milliseconds. If one of these spurious periods occur during the transmission of the code elements of a character an error may be produced but only if it coincides with an instant of "sampling" or "selection." If, however, such spurious start signal occurs during an interval between successive characters, the receiving device may commence a cycle of operations and if the next genuine character starts to arrive during the cycle, the device may get out of step with the signals. Even during an idle period if a succession of short "spaces" arrives, spurious characters may be printed. No special measures need, in general, be provided in the construction of a receiver such as an electromechanical teleprinter to guard against these effects as the inertia of the receiving electromagnet makes it unresponsive to very short signals. In the case of an electronic receiver, however, such as is used in an electronic repeater, unless some device is specially provided to guard against it, the appearance of the spurious short start signal will produce errors of transmission. Space or start signals longer than 0.5 of an element length must not be rejected as such signals are probably genuine start signals but signals of less than this length may reasonably be rejected when it is proposed to provide means for preventing the repeater from being started by spurious start signals and in the repeater according to the invention a further feature consists in providing means for preventing the repeater from responding to such short start signals.

In switched printing telegraph networks it is often required to use a long (longer than one character) space signal to clear down a circuit connection. The use of a repeater employing simple stop-signal insertion would prevent this facility being available. The invention, however, in a still further feature thereof, provides means for suppressing the automatic application of a stop signal when an "all space" character is being received.

The repeater arranged with this additional feature can still read and retransmit a stop signal if it be present even where the code employed normally makes use of an "all space" character and thus, with suitable design, both long space transmission and automatic stop signal insertion may be provided in a repeater at the same time although stop signals will not be automatically inserted at the end of "all space" characters. The invention will be described by way of example with reference to the accompanying drawing which shows diagrammatically the circuit arrangements of an electronic regenerative repeater embodying the invention.

In the drawing various circuit arrangements are shown grouped in rectangles from and to which leads, marked with arrows, are shown to indicate the interconnection of the various groups of circuits and to show the direction in which electrical currents or voltages pass to control the operation of the circuits which receive them. These interconnecting leads terminate at the boundaries of the rectangles. In order to show that the interconnecting leads are continuations of certain leads which commence within the rectangles the latter leads and the interconnecting leads are marked with identical reference letters.

Referring to the drawing telegraphic signals are received by the repeater over a transmission line X and the regenerated correct signals are retransmitted by the repeater over the output line Y to, for example, another repeater or a teleprinter apparatus. The incoming line X separates into three branches A, P and K, branch A leading to an output trigger circuit enclosed in the rectangle OTC, the branch K leading to a character timing circuit enclosed in the rectangle CTC and the branch P leading to a stop signal suppressor enclosed in the rectangle SSS.

A multivibrator is enclosed in the rectangle MVB and this apparatus is connected with the output trigger circuit OTC and with the character timing circuit CTC as well as with a short start reset circuit in the rectangle SSRC. The character timing circuit CTC is also connected with the stop signal suppressor SSS, with the short start reset circuit SSRC and with the output trigger circuit OTC.

In the following description component values will be given which were employed in a practical embodiment of the repeater in which the supply voltages were +150V and −150 and the signal voltages were ±80V, but it will be understood that different supply and signal voltages may be employed as well as different electronic values and in such cases other values may be used.

In the following description time is indicated in milliseconds from the commencement of the received start signal. Start signal polarity is called space (S) and the line condition for a start signal is positive (+). Stop signal polarity is called mark (M) and the line condition for a stop signal is negative (−). The operation of the circuits is described with reference to a 7½ unit code (1 unit start, 5 code units and 1½ units stop) at a telegraph speed of 50 bauds. It will however be understood that the repeater according to the invention may be arranged for other start-stop systems employing equal length units and working at different speeds.

Neglecting, for the present, the stop signal suppressor SSS, the incoming signal is applied to the character timing circuit CTC and the output trigger circuit OTC. Assuming a start signal is being applied to the branches A and K at zero time, $t=0$ ms., a positive voltage is applied via resistor 35 to the suppressor grid of valve V5 of CTC and, as the control grid of this valve is held positive by the multivibrator MVB over line I when the multivibrator is at rest, the valve V5 conducts. As will be explained later this has the effect of conditioning the vibrator MVB to commence generating impulses.

At the same time the positive voltage on line A is applied via resistor 1 to the suppressor grid of valve V1 of circuit OTC. Valve V1 forms with a valve V2 an Eccles Jordan trigger of the kind in which the valves remain in each triggered position until changed over by succeeding electrical impulses. The suppressor grid of valve V1 is also connected via resistor 3 to a positive potential, the resistors 1 and 3 forming a potential divider which is so proportioned that when the incoming signal is space (+) the potential of the suppressor grid is considerably above earth while when the incoming signal is mark (−), the potential of this grid is only slightly above earth.

Operation of the trigger V1, V2 causes the anode of either valve V1 or V2 to conduct. As shown, these anodes are connected through resistors 5 and 11 to the lines E and F which terminate in a polarised relay POR which is arranged to operate to apply space (+) when V1 conducts or mark (−) when V2 conducts to the output line Y. Operation of the trigger V1, V2 is, however, not effected upon application of the incoming line voltages to the suppressor grid of valve V1 and these voltages only condition the trigger for operation. Actual operation of the trigger is dependent on the reception by the suppressor grids of the valves V1 and V2 of negative going impulses which are transmitted over lines B and C by the multivibrator MVB. These impulses are very short in duration compared with the duration of a signal element or unit and are received at the suppressor grids of valves V1 and V2 at the theoretical mid-instants of the duration of the signal elements. These instants, the instants of selection, when the signal elements are sampled, are measured with reference to the commencement of the start signal and occur at the times $t=10$ ms., $t=30$ ms., $t=50$ ms. and so on.

The negative going impulses applied to line B are applied to the suppressor grid of valve V1 over resistor 2 and the proportions of the resistors 2, 1 and 3 are such that, when the incoming signal is space, the suppressor grid of valve V1 is not made negative with respect to the cathode of this valve but when the incoming signal is mark the suppressor grid of valve V1 is made negative. Furthermore the effective duration of the impulses to valve V1 over line B is predetermined, by suitably choosing the relative values of the coupling capacitors 25 and 24 in lines B and C to be slightly longer than the duration of the impulses applied over line C to valve V2.

It will be appreciated therefore that, should the incoming signal, i. e. the condition of line A, be mark, the negative going impulse applied to the suppressor grid of valve V1 will override that of the impulse applied to the suppressor grid of valve V2 and the valve V1 be forced to the cut-off or non-conducting condition whereupon valve V2 conducts. Line F is therefore negative with respect to line E and the polarised relay POR is set to apply mark signal to the output line Y. Should the incoming signal be space the negative impulse applied to valve V1 is ineffective but the negative impulse applied to valve V2 over line C will ensure that valve V2 is cut-off and the relay POR set to apply space signal to the line Y.

The circuit OTC therefore serves as a gate to the incoming signals and also serves to transmit the correct or regenerated signal elements to the output line Y, the commencement of the start element of such corrected signals being displaced in time, with respect to the commencement of the start element of the original signals appearing on the line X, by half the duration of a signal element.

During the intervals between the transmission of characters over the line X and when the line X is at mark condition, the multi-vibrator MVB is quiescent. This multi-vibrator comprises a relaxation oscillator which works on a start-stop basis and since V6 is conducting is held quiescent during the intervals by a negative potential applied via line G to the suppressor grid of valve V3 of the multi-vibrator by the character timing circuit CTC. When a start signal is applied to circuit CTC, V6 becomes non-conducting and the potential of line G, and that of the suppressor grid of valve V3, is held at earth potential over a potential divider 42, 43 so that valve V3 is free to conduct. The normal mode of oscillation of the multi-vibrator then ensues and the consequent pulse outputs from the multi-vibrator are taken from the screen electrodes of the valves V3 and V4 and the impedances of the circuits to which these outputs are fed are high compared with the values of the screen feed resistors 17 and 23.

The relaxation oscillator has a half-period of 10 milliseconds producing negative going impulses at B and C simultaneously at times $t=10$ ms., $t=30$ ms., etc., and producing at line H positive going impulses at times $t=10$ ms., $t=30$ ms. . . . $t=130$ ms. The oscillator also produces, during alternate half cycles and in particular during the time interval $t=130$ ms. to $t=140$ ms. a negative condition on the line I.

The period during which the multi-vibrator MVB operates to control the transmission of a character to the output line Y is determined by the circuit CTC, commencement of the period being determined as stated above by the placing of line G at earth potential while the end of the period is determined by the placing of line G at negative potential consequent on transmission of a positive impulse by the multi-vibrator MVB over line H. It will be understood that a positive impulse appears on line H, as stated above, at times $t=10$ ms. to $t=130$ ms. and the circuit CTC is arranged to be unresponsive to any of these impulses except that which appears at time $t=130$ ms. The character timing circuit CTC comprises a gate circuit (valve V5) and a flip-flop trigger circuit (valves V6, V7 and V8).

When a start signal appears on branch line K this signal is applied, via resistor 35, to the suppressor grid of valve V5. The multi-vibrator is now quiescent and the voltage on line I is positive. Line I is connected to the control grid of valve V5 so that valve V5 now conducts and a negative potential is applied via resistor 38 to the suppressor grid of valve V6 which, with valve V7, forms a flip-flop trigger circuit with a natural relaxation period of somewhat greater than 130 ms. the arrangement being such however, that when the positive impulse is applied via line H to control grid of valve V6 at $t=130$ ms. the trigger is reset to normal with the valve V6 conducting and valve V7 cut-off. The negative impulse applied to the suppressor grid of valve V6 cuts-off this valve and the consequent positive impulse is applied via resistor 42 to the control grid of valve V7 which thereupon conducts. The anode of valve V7 is connected via capacitor 48 to the control grid of valve V6.

When valve V6 is cut-off the potential at line G becomes earth so that the multi-vibrator MVB starts and short negative impulses are transmitted to circuit OTC as described above. The elements of the character on the incoming line X are thus transmitted in turn until time 130 ms. when the flip-flop circuit of valves V6 and V7 has reached a condition in which the positive impulse from the multi-vibrator over line H is able to reset the flip-flop circuit by making the control grid of valve V6 positive.

During the time $t=130$ ms. to $t=140$ ms. when the multi-vibrator holds line I negative no incoming start signals on line K can influence the valves V6 and V7. Such start signals cannot therefore affect the potentials on line D. When the valve V7 was made conducting on receipt of a start signal over line K, the potential of the screen of this valve fell. The potential of this screen is applied by line D to a coupling potential divider network formed by resistors 6, 7 and 8 in circuit OTC. These resistors are so proportioned that the lowered voltage of line D is not able to affect the operation of trigger V1 and V2 which thus operates under the control of the voltages on line A and the selecting impulses from the multi-vibrators MVB. When, however, at the end of the operated period of trigger V6, V7, i. e. at time $t=130$ ms. the valve V7 becomes cut-off and the voltage on line D rises, the consequent positive condition of line D is sufficient to make the potential of the control grid of valve V2 positive so that this valve conducts and the relay POR is caused to place the output line Y in mark condition. An automatic stop signal is thus inserted at the appropriate time, i. e. at the end of the transmission of the code elements. This mark condition of line Y is held until a fresh start signal is received over line X.

When V7 becomes cut off, its anode potential tends to restore exponentially towards the supply voltage, but the diode V8 which is connected to a potential lower than the supply voltage becomes conducting when the anode voltage reaches the lower potential. Hence the anode transient is abruptly terminated and the time of recovery of the circuit CTC to its initial condition is shortened.

When it is desired to use the arrangements already described for automatically inserting a stop signal and at the same time make it possible to retransmit a space which is considerably longer than a character, means must be provided to prevent the stop signal from being inserted when the long space is received. Such means are embodied in the stop signal suppressor SSS. This circuit operates as follows: at the commencement of the reception of a space signal the repeater commences to function normally as described above and in addition at time $t=0$ ms. the control grid of valve V11 is made positive by branch line P. This line is connected to the control grid of valve V11 through resistor 70 and also to the suppressor grid of valve V12. At time $t=0$ ms., V11 conducts and, via capacitor 72, forces the control grid of valve V12 to a negative potential. The time constant of the coupling circuit is made such that, in the absence of a further marking signal, V12 is cut off for a period of nominally 120 milliseconds (this may actually be between 110 and 130 milliseconds). If the incoming signal restores to mark within 120 milliseconds the control grid of V12 is restored to earth potential but the valve cannot conduct as its suppressor grid is held by line P to the negative mark polarity. If the space signal is continuous for 120 milliseconds the grid of valve V12 reaches earth potential and this valve conducts. This condition is effected by either an all-space character or a continuous space. The anode of valve V12 is connected via line M to the anode of valve V5 and via resistor 38 to the suppressor grid of valve V6 so that, if valve V12 is conducting, the suppressor grid of valve V6 is made negative and this valve is unable to conduct even though its grid is made positive at the end of the character transmitting period when a positive pulse is applied over line H by the multi-vibrator MVB. However, when an incoming all-space character is received the negative marking potential on P should be received before time $t=130$ ms. so that valve V12 should be cut off before $t=130$ ms. Conversely with an incoming continuous space valve V12 is conducting at $t=130$ ms. so that, as described above, trigger V6, V7 is prevented from restoring and applying a positive potential to line D to cause mark to be applied to output line Y. At the conclusion of a continuous space on line X and branch P valve V12 is cut-off and all circuits are restored to their normal rest condition and the output line is held at mark.

The circuit SSRC is provided to prevent a full cycle of operations of the receiver being initiated should a very short (i. e. less than 0.5 unit element) space signal be received over line X. This circuit SSRC comprises an Eccles-Jordan trigger V9, V10 which controls a gate circuit combined with one element of the trigger in one valve. This circuit SSRC operates as follows: at time $t=0$ ms. a negative going impulse is produced at line O by valve V7 of circuit CTC in the manner described for the negative potential on line D, line O being connected to the screen of valve V7 via a capacitor 46. The negative impulse on line O is applied to the suppressor grid of valve V10 so that this valve is cut-off. A consequential positive potential is applied to the control grid of valve V9 so that the screen of this valve conducts. The suppressor grid of valve V9 is normally biassed to cut-off this valve so that its anode cannot conduct at this point. At time $t=10$ ms., if the start signal has persisted for the length of time, a negative impulse is received over line J of the multi-vibrator MVB this line J being connected to the screen of valve V4 via capacitor 26. The negative impulse on line J is applied to the control grid of valve V9 so that the effect of the positive voltage applied by valve V10 is nullified and the circuit SSRC restores to normal. Thereafter V9 cannot conduct. If, however, between time $t=0$ ms. and $t=10$ ms., the incoming signal has changed to mark, a positive impulse is received on line N from valve V5 over capacitor 37. The positive impulse on line N is applied to the suppressor grid of value V9 which conducts and generates a negative impulse on line L through capacitor 58. The negative impulse on line L is applied to the suppressor grid of valve V7 and this valve is cut-off. Consequently the trigger circuit V6, V7 and the character timing circuit CTC is restored to normal. After time $t=10$ ms. valve V9 becomes inoperative to effect any control of circuit CTC as after the initial negatiive impulse applied to line O no further such impulse is received after the multi-vibrator MVB has cut-off valve V9 at time $t=10$ ms.

It will also be appreciated that the multi-vibrator may, if required, be synchronised to a source of some higher frequency for the purpose of obtaining close frequency regulation.

With the supply and signal voltages specified in the foregoing suitable valves and component values for the various circuits are given below by way of example.

*Circuit OTC*

| Component: | Value or type |
|---|---|
| V1, V2 | CV138 |
| 1 | 680KΩ |
| 2 | 270KΩ |
| 3, 9 | 1MΩ |
| 4, 10 | 1MΩ |
| 5, 11 | 22KΩ |
| 6, 8 | 560KΩ |
| 7, 13 | 470KΩ |
| 12 | 360KΩ |

*Circuit MVB*

| Component: | Value or type |
|---|---|
| V3, V4 | CV138 |
| 21, 29 | 1MΩ |
| 20, 28 | 15,000 pf. |
| 22 | 5KΩ (variable) |

Resistors 21 and 29 are tapped to provide for adjustment of frequency.

*Circuit CTC*

| Component: | Value or type |
|---|---|
| V5, V6, V7 | CV138 |
| V8 | CV140 |
| 45, 47 | 56,KΩ |
| 48 | 0.05 μf. |
| 49 | 4.8M |

*Circuit SSRC*

| Component: | Value or type |
|---|---|
| V9, V10 | CV138 |
| 72 | 0.045 μf. |
| 73 | 4.7MΩ |

Other component values will be readily determined by the application of known design methods.

We claim:

1. An electronic regenerative telegraph repeater comprising an incoming signal line and an outgoing signal line, a relay for applying to the outgoing line signals of polarity corresponding to signals received on the incoming line, an electronic switching circuit to which the incoming signals are applied and which is connected to the relay, a multi-vibrator circuit arranged to apply to the electronic switching circuit conditioning impulses related in frequency to a desired speed of signal transmission, a character timing circuit which initiates operation of the multivibrator circuit and stops the multivibrator circuit when a predetermined number of impulses have been generated, and means for automatically applying a stop signal to the outgoing line to provide an idle period between succeeding characters regardless of the signals on the incoming signal line.

2. An electronic regenerative telegraph repeater according to claim 1 in which the multivibrator circuit comprises multi-grid electronic valves, the control grids of which are connected to a source of positive potential and in which oscillation of the circuit is initiated by the application of an appropriate potential to a suppressor grid of one of the valves, the oscillation being stopped by the application of appropriate potential to the same suppressor grid.

3. An electronic regenerative telegraph repeater according to claim 1, in which the stop signal is derived from the character timing circuit and has a predetermined minimum duration which is controlled by the multivibrator circuit.

4. An electronic regenerative telegraph repeater according to claim 1 in which the character timing circuit includes an electronic valve relaxation circuit arranged to apply an impulse to the electronic switching circuit in order to condition the switching circuit to apply the stop signal to the outgoing line independently of the condition of the incoming line.

5. An electronic regenerative telegraph repeater according to claim 1 and comprising means for suppressing the automatic application of the stop signal to the outgoing line when a long space signal is received on the incoming line.

6. An electronic regenerative telegraph repeater according to claim 5, in which the means for suppressing the stop signal comprises an electronic valve circuit to which the incoming signals are applied, and which is arranged to operate so that after an all-space signal of predetermined period the electronic valve circuit prevents an impulse from being applied to the electronic switching circuit which otherwise would be conditioned to apply a stop signal to the outgoing line.

7. An electronic regenerative telegraph repeater according to claim 5, in which the stop signal suppressor circuit is arranged to prevent the relaxation circuit included in the character timing circuit from reverting to its non-operative condition when a long space signal is received on the incoming line.

8. An electronic regenerative telegraph repeater according to claim 1, and including means for preventing operation of the relay connected to the outgoing line when a start signal of less than predetermined time duration is received on the incoming line.

9. An electronic regenerative telegraph repeater according to claim 8 in which the means for preventing operation of the relay under the condition referred to comprises an electronic valve reset circuit, and in which the multivibrator is arranged to apply an impulse to said reset circuit which is thereby rendered inoperative after said predetermined time has elapsed.

10. An electronic regenerative telegraph repeater according to claim 9 in which the reset circuit is arranged to apply an impulse to the relaxation circuit included in the character timing circuit, to restore the relaxation circuit to its non-operated condition when a start signal of less than predetermined time duration is received.

11. An electronic regenerative telegraph repeater comprising an incoming signal line and an outgoing signal line, a relay for applying to the outgoing line signals of polarity corresponding in signals received on the incoming line, an electronic switching circuit to which the incoming signals are applied and which is connected to the relay, an impulsing means arranged to apply to the electronic switching circuit conditioning impulses related in frequency to a desired speed of signal transmission, a character timing circuit which initiates operation of the impulsing means and stops the impulsing means when a predetermined number of impulses have been generated, and means for automatically applying a stop signal to the outgoing line to provide an idle period between succeeding characters regardless of the signals on the incoming signal line.

12. Regenerative repeater for start-stop printing telegraph signal combinations comprising (1) a time base circuit, (2) means operative upon the receipt of a start element to start said time base circuit into operation to time the elements of a signal combination, (3) examining means under the control of said time base circuit to examine the condition of the incoming signal during each signal element period, (4) means to re-transmit a signal element of the kind determined by said examining means, (5) means operative upon the persistence of the start condition for a period longer than the period of a signal combination to cause said retransmitting means to continue to transmit a start condition during each period of persistence, (6) and means operative on the receipt of a stop condition immediately following said persistent start condition to restore the time base circuit to initial condition ready to be restarted by the next ensuing start condition and to cause the retransmission of a stop condition in the interim.

References Cited in the file of this patent

UNITED STATES PATENTS

| | | |
|---|---|---|
| 2,406,096 | Morrison | Aug. 20, 1946 |
| 2,430,547 | Anderson | Nov. 11, 1947 |
| 2,474,490 | Pelle | June 28, 1949 |
| 2,502,942 | Godall | Apr. 4, 1950 |

FOREIGN PATENTS

| | | |
|---|---|---|
| 470,645 | Great Britain | Aug. 19, 1937 |